United States Patent
Bamba et al.

(10) Patent No.: US 8,938,151 B2
(45) Date of Patent: Jan. 20, 2015

(54) VIDEO DISTRIBUTION APPARATUS AND VIDEO DISTRIBUTION METHOD

(75) Inventors: Yasuo Bamba, Kawasaki (JP); Toshimizu Yamane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/310,456

(22) Filed: Dec. 2, 2011

(65) Prior Publication Data
US 2012/0148213 A1 Jun. 14, 2012

(30) Foreign Application Priority Data

Dec. 14, 2010 (JP) ................................ 2010-278288

(51) Int. Cl.
| | |
|---|---|
| H04N 5/775 | (2006.01) |
| H04N 9/82 | (2006.01) |
| H04N 5/76 | (2006.01) |
| H04N 21/4402 | (2011.01) |
| H04N 21/45 | (2011.01) |

(52) U.S. Cl.
CPC ............... H04N 9/8205 (2013.01); H04N 5/76 (2013.01); H04N 21/4402 (2013.01); H04N 21/4532 (2013.01)
USPC ............ 386/230; 386/248; 386/290; 386/282

(58) Field of Classification Search
USPC .................................. 386/230, 248, 290, 282
See application file for complete search history.

(56) References Cited

U.S. PATENT DOCUMENTS

| | | | | |
|---|---|---|---|---|
| 6,154,601 | A * | 11/2000 | Yaegashi et al. | 386/282 |
| 7,805,678 | B1 * | 9/2010 | Niles et al. | 715/716 |
| 8,229,287 | B1 * | 7/2012 | Duggal et al. | 386/344 |
| 2001/0040592 | A1 * | 11/2001 | Foreman et al. | 345/723 |
| 2002/0012526 | A1 * | 1/2002 | Sai et al. | 386/69 |
| 2008/0104534 | A1 * | 5/2008 | Park et al. | 715/772 |
| 2010/0003006 | A1 * | 1/2010 | Tokunaka | 386/52 |
| 2010/0070888 | A1 * | 3/2010 | Watabe et al. | 715/760 |
| 2010/0228418 | A1 * | 9/2010 | Whitlow et al. | 701/25 |
| 2013/0079073 | A1 * | 3/2013 | Sharifi | 463/3 |
| 2013/0298021 | A1 * | 11/2013 | Park et al. | 715/716 |

FOREIGN PATENT DOCUMENTS

| | | |
|---|---|---|
| JP | H08-292965 A | 11/1996 |
| JP | 2001-292402 A | 10/2001 |
| JP | 2004-072540 A | 3/2004 |
| JP | 2006-287875 A | 10/2006 |
| JP | 2007-208651 A | 8/2007 |
| JP | 2009-005221 A | 1/2009 |

* cited by examiner

*Primary Examiner* — Helen Shibru
(74) *Attorney, Agent, or Firm* — Canon USA, Inc. IP Division

(57) ABSTRACT

A display control apparatus includes an obtaining unit configured to obtain a number of predetermined scenes in a video, and a display control unit configured to display, on a display unit, a timeline in which an object indicating a position of the predetermined scene in the video is arranged. The display control unit performs control such that in a case where the number of the predetermined scenes included in a predetermined time period of the video is larger than a predetermined number, the predetermined time period is displayed, on the timeline, with a first width, and in a case where the number of the predetermined scenes included in the predetermined time period of the video is smaller than the predetermined number, the predetermined time period is displayed, on the timeline, with a second width different from the first width.

22 Claims, 12 Drawing Sheets

FIG. 2

| METADATA CLASS | METADATA TYPE | VIDEO START POINT |
|---|---|---|
| SCENE | NIGHT VIEW | 0:00:14.16. 0:05:44.63 |
| | SEA | NONE |
| | SPORTS MEETING | NONE |
| FACE | ID=0000100 | 0:03:22:76 |
| | ID=0000123 | 0:01:07.10. 0:02:24.20. 0:04:11.76 |
| | CHILD | 0:03:22:76 |
| USER DEFINED | FAVORITE | 0:01:37.93. 0:01:57.16 |
| | LOUD | 0:01:21.40. 0:04:33.00 |
| SOUND | CHILD'S LAUGHING VOICE | 0:03:31:10 |
| | MUSIC | NONE |

FIG. 3

| METADATA CLASS | METADATA TYPE | SCORE |
|---|---|---|
| SCENE | NIGHT VIEW | 5 |
| | SEA | 3 |
| | SPORTS MEETING | 1 |
| FACE | ID=0000100 | NOT REGISTERED |
| | ID=0000123 | 4 |
| | CHILD | 4 |
| USER DEFINED | FAVORITE | 4 |
| SOUND | LOUD | -3 |
| | CHILD'S LAUGHING VOICE | 4 |
| | MUSIC | NOT REGISTERED |

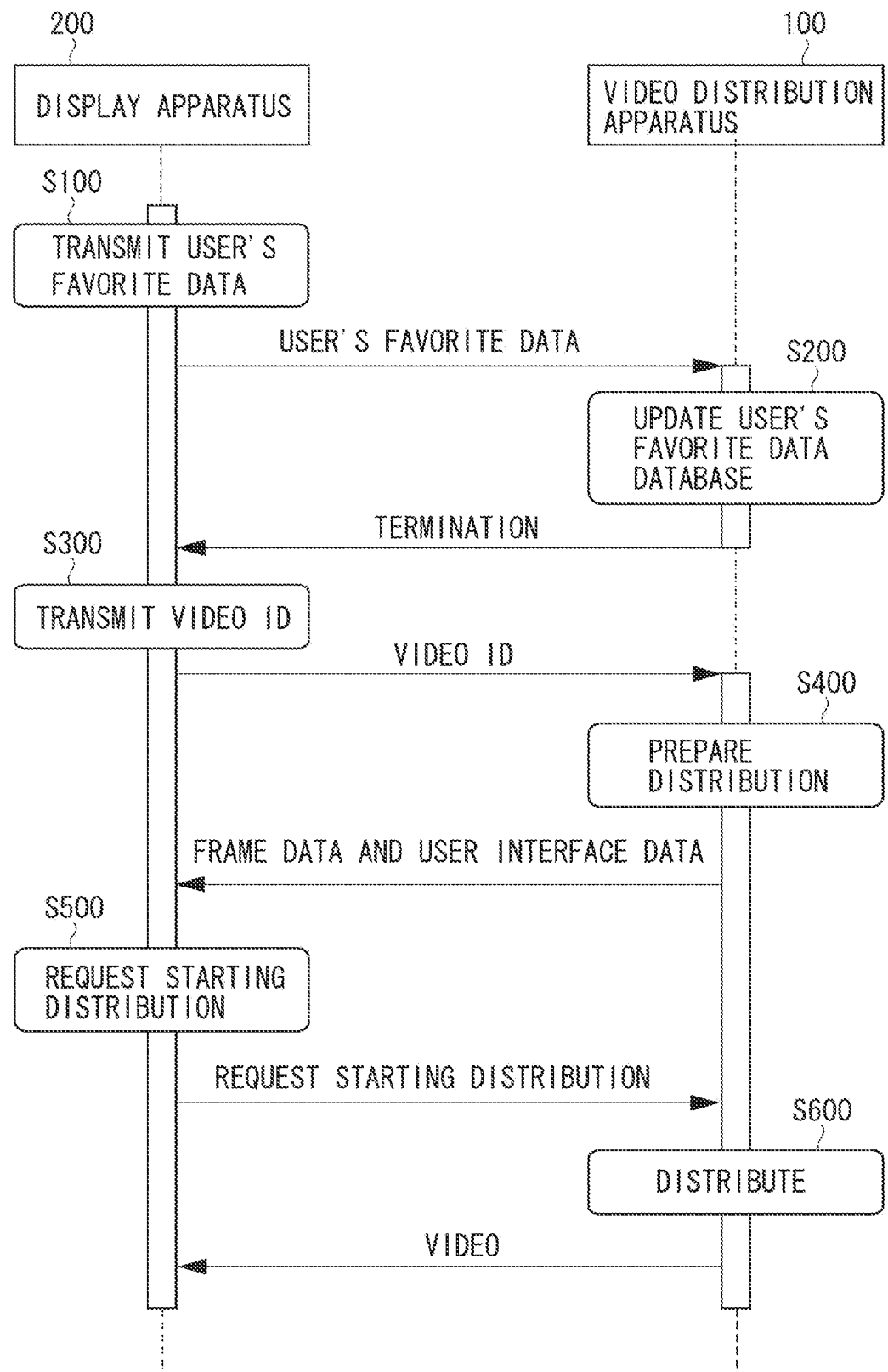

FIG. 6

```xml
<?xml version= "1.0" ?>
<userPreference>
  <userID>0000123</userID>
  <metaData id= "1" >
    <type class= "scene" >night view</type>
    <score>5</score>
  </metaData>
  <metaData id= "2" >
    <type class= "face" >0000123</type>
    <score>4</score>
  </metaData>
  <metaData id= "3" >
    <type class= "user def" >favorite</type>
    <score>4</score>
  </metaData>
 <metaData id= "4" >
    <type class= "sound" >loud</type>
    <score>-3</score>
 <metaData>
 ...
</userPrefence>
```

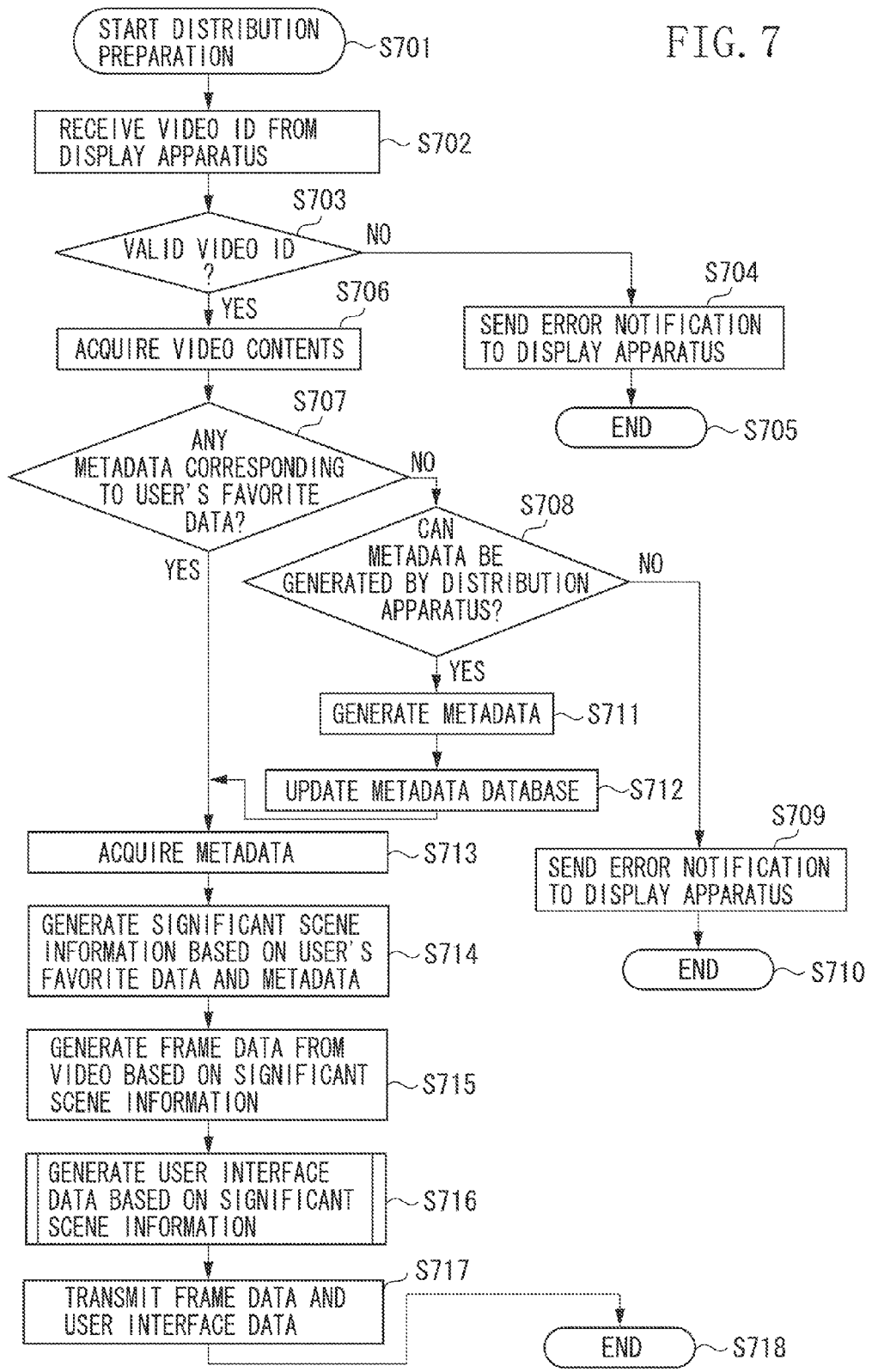

FRAME frame id=1        frame id=2

FRAME RELATED DATA

```
<?xml version="1.0" ?>
<frameData>
  <frame id="1">
    <time id>0:00:14.16</time>
    <type class="scene">night view</type>
  </frame>
  <frame id="2">
    <time id>0:01:07.10</time>
    <type class="face">0000123</type>
  </frame>
  ...
</frameData>
```

FIG. 10

```xml
<?xml version="1.0" ?>
<userInterface class="seekBar" >
   <totalTime>0:06:00.00</totalTime>
   <timeAndLocation id="1" >
      <time id>0:01:00.00</time>
      <location>12.50%</location>
   </timeAndLocation>
   <timeAndLocation id="2" >
      <time id>0:02:00.00</time>
      <location>43.75%</location>
   </timeAndLocation>
    ...
   </timeAndLocation id="6" >
      <time>0:06:00.00<time>
      <location>100.00%</location>
   </timeAndPosition>
</userInterface>
```

VIDEO DISTRIBUTION APPARATUS AND VIDEO DISTRIBUTION METHOD

BACKGROUND OF THE INVENTION

1. Field of the Invention

Embodiments of the present invention relate to a video distribution apparatus and a video distribution method. More specifically, one disclosed aspect of the embodiments relates to a technique enable a user to easily seek a significant scene considering user's preference.

2. Description of the Related Art

Video analysis techniques and audio recognition techniques have been recently developed to process video data including plenty of metadata pieces. Information allocated to video data as metadata includes, for example, information identifying a person appearing in each scene or information indicating a scene where child's laughing voice may be heard. Japanese Patent Application Laid-Open No. 2001-292402 or in Japanese Patent Application Laid-Open No. 2007-208651 discusses a method for utilizing metadata to enable users to quickly find a scene to watch or to watch only scenes according to user's preference.

Further, communication networks have been recently developed to realize a new viewing style that enables a plurality of users to enjoy streaming reproduction of a video stored in a video distribution apparatus on each user's display apparatus via a network. Thus, a video distribution system is required to satisfy requirements for providing a user interface that enables each user to easily seek a significant scene considering user's preference.

Further, it will be convenient if a frame clipped from a video may be referred to when a user seeks a significant scene from the video. More specifically, representative frames are displayed on a video display screen while a user moves a slider. A method discussed in Japanese Patent Application Laid-Open No. 2006-287875 includes acquiring video data of a plurality of video frames that are present in a predetermined advance reading period while performing streaming reproduction.

However, an apparatus discussed in Japanese Patent Application Laid-Open No. 2001-292402 is premised that a user watches only the locally stored video contents. Therefore, the apparatus discussed in Japanese Patent Application Laid-Open No. 2001-292402 is not usable for a plurality of users to watch videos stored in the video distribution apparatus via a network. As a result, it was conventionally unfeasible to provide a user interface that enables each of a plurality of users to reproduce video contents according to user's preference via a network.

Further, an apparatus discussed in Japanese Patent Application Laid-Open No. 2007-208651 is usable in a case where video/audio data and metadata are acquired via broadcasting or communications. However, the function of generating a highlight segment using the metadata and user's favorite data is present in a content viewing apparatus. Accordingly, the highlight segment may not be completely extracted unless the content viewing apparatus receives all pieces of the video/audio data and metadata. Further, the processing load of the content viewing apparatus largely increases because the content viewing apparatus is required to extract highlight segments.

Further, the apparatus discussed in Japanese Patent Application Laid-Open No. 2006-287875 transmits frame data extracted and generated simply from video contents during a predetermined time interval, without considering the importance of each scene. Therefore, a scene according to preference of each user may not be quickly sought.

SUMMARY OF THE INVENTION

One disclosed aspect of the embodiments relates to a display control system that enables each user to easily seek a significant scene for him/her when a plurality of users may watch videos stored in a display control apparatus.

According to an aspect of the embodiments, a display control apparatus includes an obtaining unit configured to obtain a number of predetermined scenes in a video, and a display control unit configured to display, on a display unit, a timeline in which an object indicating a position of the predetermined scene in the video is arranged. The display control unit performs control such that in a case where the number of the predetermined scenes included in a predetermined time period of the video is larger than a predetermined number, the predetermined time period is displayed, on the timeline, with a first width, and in a case where the number of the predetermined scenes included in the predetermined time period of the video is smaller than the predetermined number, the predetermined time period is displayed, on the timeline, with a second width different from the first width.

The embodiments may provide a video distribution system that enables each user to easily seek a significant scene for him/her when a plurality of users may watch videos stored in the video distribution apparatus and further enables each user to easily reproduce video contents according to user's preference.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the embodiments and, together with the description, serve to explain the principles of the embodiments.

FIG. 2 illustrates a specific example of metadata according to an exemplary embodiment.

FIG. 3 illustrates a specific example of user's favorite data according to an exemplary embodiment.

FIG. 5 is a sequence diagram illustrating an example of an entire processing flow according to an exemplary embodiment.

FIG. 6 illustrates a specific example of user's favorite data described in an extensible markup language (XML) format.

FIG. 7 is a flowchart illustrating a detail of distribution preparation illustrated in FIG. 5.

FIG. 10 illustrates a specific example of user interface data.

DESCRIPTION OF THE EMBODIMENTS

Various exemplary embodiments, features, and aspects of the embodiments will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
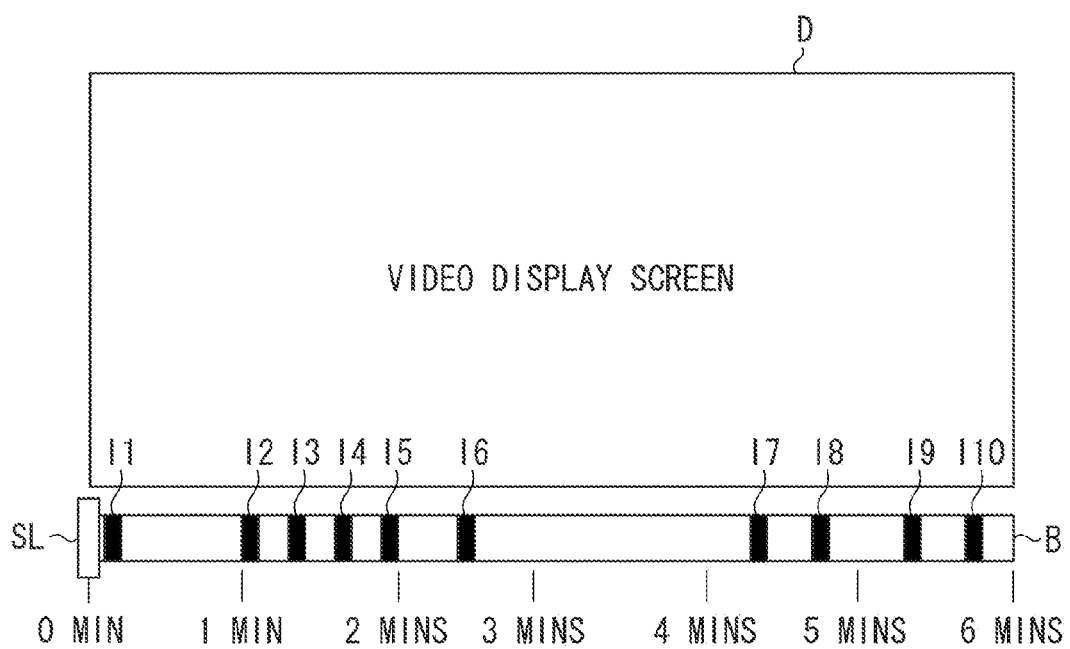
FIG. 1 illustrates a specific example of a generally used seek bar.

First, a general seek bar is described below. The seek bar is a user interface usable for a general display apparatus. FIG. 1 illustrates an example of the general seek bar. The user interface illustrated in FIG. 1 includes a linearly extending bar B. The length of the bar B projected on a display screen may represent a reproduced amount in an entire video. The left edge of the bar B corresponds to a start point of the video, and the right edge of the bar B corresponds to an end point of the video. The horizontal position of the bar B and the elapsed time of the video are generally in a proportional relationship.

If a user requests reproduction of a video, the video may be displayed on a video display screen D. During video reproduction, a slider SL moves along the bar B from the left to the right in such a way as to correspond to a current time point of the reproduced video. Further, if the user moves the slider SL to an intended position on the bar B using an appropriate operation device, the video may be reproduced from a time point corresponding to the position of the slider SL. In other words, the seek bar enables each user to reproduce a video from an arbitrary time point designated by the slider SL.

The above-described general seek bar has the following issues. For example, a user may want to watch each scene where the user appears. In this case, if each scene where the user appears is projected on the seek bar, the scenes will be disposed as indicated by I1 to I10 in FIG. 1. In general, each time point is in a proportional relationship with the bar B. Therefore, significant scenes for the user may be disproportionally found on the seek bar.

In such a case, the user is required to move the slider SL largely to skip an unnecessary area for the user if it extends widely. On the other hand, the user is required to move the slider SL finely to seek each significant scene in the concentrated area. Therefore, the above-described general seek bar is not usable to realize video reproduction that is convenient for each user.

Hereinbelow, an exemplary embodiment is described. First, terminologies used in the following description are defined as follows.

"Metadata" represents data attached to or associated with a video. More specifically, the "metadata" is data representing video features of a scene appearing at each time point of the video. More specifically, the metadata includes at least one of face/object recognition information, scene recognition information, zooming operation information performed on a video camera which captured the video, sound volume change information, audio recognition information, and user defined tagged information. For example, the metadata may include information indicating that a child's face appears at a time point 0 min 14.16 seconds of the video. The metadata may be embedded in the video, or may be managed independently of the video. In the following exemplary embodiment, the description is based on the latter case. FIG. 2 illustrates an example of the metadata.

"User's favorite data" represents a score allocated to various pieces of information which is provided as metadata. The allocated score indicates the degree of user's preference with respect to each metadata. FIG. 3 illustrates an example of the user's favorite data.

A "significant scene" represents a time point of a video corresponding to a metadata type that has a higher score in the user's favorite data.

Figure 4:
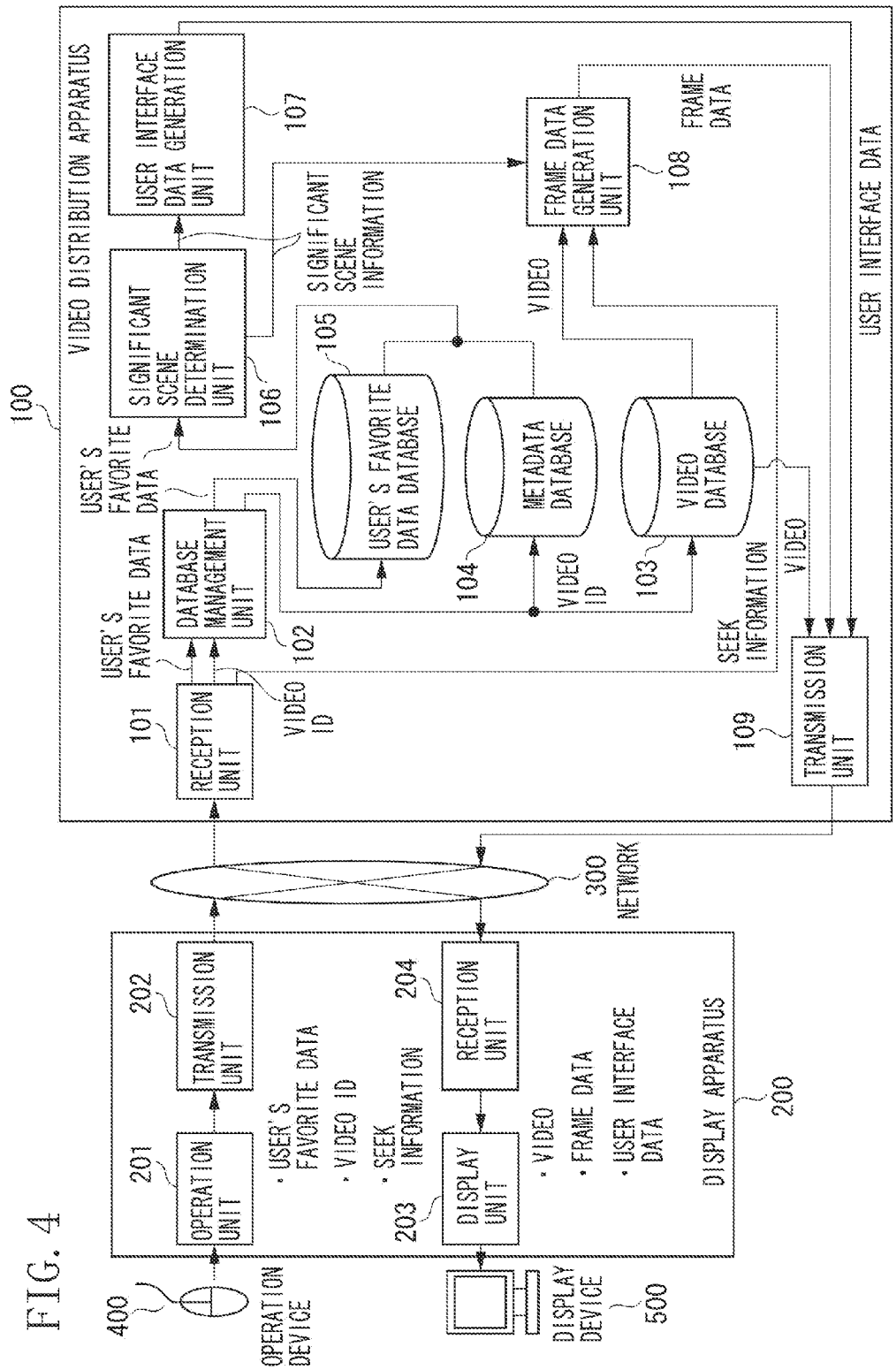
FIG. 4 is a block diagram illustrating an example configuration of a video distribution system according to an exemplary embodiment.

FIG. 4 illustrates a configuration of a representative video distribution system according to the exemplary embodiment. The video distribution system according to the present exemplary embodiment includes a video distribution apparatus 100 and at least one display apparatus 200. The video distribution apparatus 100 is connected to the display apparatus 200 via a network 300. A user may operate the display apparatus 200 to watch a video stored in the video distribution apparatus 100 via the network 300.

Components of the video distribution apparatus 100 illustrated in FIG. 4 are described below. A reception unit 101 and a transmission unit 109 may receive and transmit information from and to the display apparatus 200. A video database 103 stores video contents corresponding to each video identification (ID). In the present exemplary embodiment, the video ID is identification information usable to identify corresponding video content. A metadata database 104 stores metadata of the video contents corresponding to the video ID.

A user's favorite data database 105 stores user's favorite data transmitted and acquired from the display apparatus 200. A database management unit 102 may manage each of the video database 103, the metadata database 104, and the user's favorite data database 105. The present exemplary embodiment employs a method for causing the video distribution apparatus 100 to use the user's favorite data transmitted from the display apparatus 200. However, the database management unit 102 may be configured to generate user's favorite data considering user's preference.

A significant scene determination unit 106 may generate video significant scene information based on the metadata weighted considering the user's favorite data. "Significant scene information" represents information summarizing that how many significant scenes for which user appear on which time points of the video. A user interface data generation unit 107 may generate customized user interface data suitable for each user to seek significant scenes based on the obtained significant scene information. A frame data generation unit 108 generates frame data from the video based on the significant scene information, video contents, and seek information. In the present exemplary embodiment, the "frame data" includes a frame extracted from a video and data relating to the extracted frame.

Components of the display apparatus 200 illustrated in FIG. 4 are described below. An operation unit 201 is connected to an operation device 400 and may accept a user's operation via the operation device 400. Further, the operation unit 201 generates seek information that indicates a frame of video contents selected by a user. A display unit 203 outputs video contents received from the video distribution apparatus 100 to a display device 500 to display the received video contents.

The display unit 203 receives user interface data from the video distribution apparatus 100 and generates a user interface to be displayed based on the received data. Further, the display unit 203 receives frame data from the video distribution apparatus 100 to display a frame appropriately when a user performs a seek operation. A transmission unit 202 and a reception unit 204 may transmit and receive information to and from the video distribution apparatus 100.

An example processing flow according to the present exemplary embodiment is described below with reference to FIG. 5. First, in operation S100, the display apparatus 200 transmits user's favorite data to the video distribution apparatus 100. In operation S200, the video distribution apparatus 100 stores the transmitted user's favorite data in the user's favorite data database 105 illustrated in FIG. 4. A specific example of the transmitted user's favorite data is described in detail below.

Next, in operation S300, the display apparatus 200 transmits a desired video ID to the video distribution apparatus 100. In operation S400, the video distribution apparatus 100 performs preparation for video distribution based on the received video ID and transmits generated frame data and user interface data to the display apparatus 200. The detail of the distribution preparation (i.e., processing in operation S400) is described in detail below.

Subsequently, in operation S500, the display apparatus 200 notifies the video distribution apparatus 100 of a distribution start request. In operation S600, the video distribution apparatus 100 distributes video contents in response to the distribution start request. Namely, the video distribution apparatus 100 transmits requested video contents to the display apparatus 200. The detail of the video distribution (i.e., processing in operation S600) is described in detail below. As described above, the display apparatus 200 and the video distribution apparatus 100 may perform video distribution processing according to the present exemplary embodiment.

Next, a specific example of the user's favorite data transmitted from the display apparatus 200 to the video distribution apparatus 100 is described below with reference to FIG. 6. In the present exemplary embodiment, the user's favorite data received from an external device has a data format expressed using the extensible markup language (XML) or its binarized format. The user's favorite data includes the following contents.

(1) ID identifying each user, (2) class and type of metadata, and (3) score allocated to metadata.

FIG. 6 illustrates an example of favorite settings with respect to four types of metadata, which have been performed by a user having ID "0000123." According to the example illustrated in FIG. 6, the first description contained in the user's favorite data means that a score "5" is allocated to "night view" belonging to a "scene" class. The second description contained in the user's favorite data means that a score "4" is allocated to ID "0000123" (i.e., the user) belonging to a "face" class.

The third description contained in the user's favorite data means that a score "4" is allocated to "favorite" belonging to a "user-defined" class. In the present exemplary embodiment, the "user-defined" class is a class to which metadata tagged by the user belongs. The fourth description contained in the user's favorite data means that a score "−3" is allocated to "loud" belonging to a "sound" class. In the present exemplary embodiment, a negative score means that the user dislikes watching the scene.

Next, a specific example of a method for the distribution preparation (i.e., the processing in operation S400) is described in detail below with reference to FIG. 4 and FIG. 7.

In operation S701, the video distribution apparatus 100 starts the distribution preparation. Then, in operation S702, the video distribution apparatus 100 receives a video ID from the display apparatus 200.

In operation S703, the database management unit 102 checks if video contents corresponding to the received video ID are present, and confirms whether the received video ID is valid. If it is determined that the received video ID is invalid (NO in operation S703), then in operation S704, the database management unit 102 notifies the display apparatus 200 of an error. In operation S705, the database management unit 102 terminates the distribution preparation.

If the database management unit 102 determines that the received video ID is valid (YES in operation S703), then in operation S706, the database management unit 102 reads video contents corresponding to the video ID from the video database 103.

Subsequently, in operation S707, the database management unit 102 checks if the metadata having a score allocated in the user's favorite data is present in the metadata database 104. If it is determined that the corresponding metadata is not present (NO in operation S707), then in operation S708, the database management unit 102 checks if the metadata may be generated by the video distribution apparatus 100.

If it is determined that the metadata may be generated by the video distribution apparatus 100 (YES in operation S708), then in operation S711, the database management unit 102 executes metadata generation processing to dynamically generate metadata from the video contents. In operation S712, the database management unit 102 updates the metadata database 104.

If it is determined that the metadata may not be generated by the video distribution apparatus 100 (NO in operation S708), then in operation S709, the database management unit 102 notifies the display apparatus 200 of an error. In operation S710, the database management unit 102 terminates the distribution preparation. Alternatively, if the corresponding metadata is not present, the video distribution apparatus 100 may continue the processing without using the method illustrated in FIG. 7 while discarding the user's favorite data corresponding to the metadata.

In operation S713, the video distribution apparatus 100 acquires the metadata. Then, in operation S714, the significant scene determination unit 106 generates significant scene information (i.e., the information summarizing that how many significant scenes for which user appear on which time points of the video) based on the acquired metadata. In this case, the importance of each scene may be weighted according to the score allocated in the user's favorite data.

In operation S715, the frame data generation unit 108 generates frame data at each significant scene based on the significant scene information. Then, in operation S716, the user interface data generation unit 107 generates user interface data optimized for the display apparatus 200.

Then, in operation S717, the transmission unit 109 transmits the frame data and the user interface data to the reception unit 204 of the external display apparatus 200 via the network 300. Thus, the video distribution apparatus 100 accomplishes the distribution preparation of the video contents. In operation S718, the video distribution apparatus 100 terminates the processing.

Next, a specific example of the frame data transmitted from the video distribution apparatus 100 to the display apparatus 200 is described below.

Figure 8:
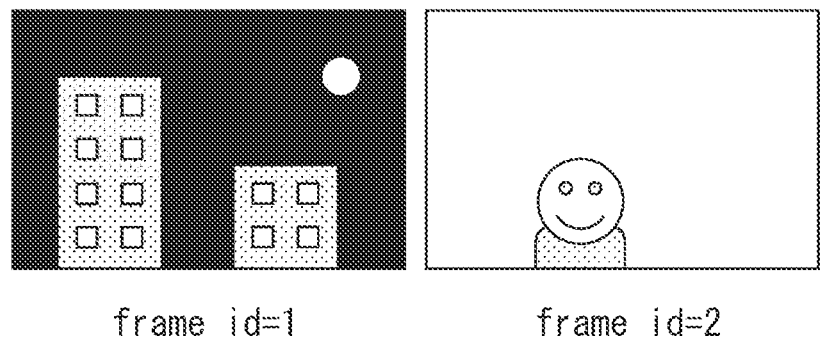
FIG. 8 illustrates a specific example of frame data according to an exemplary embodiment.

As described above, the frame data includes a frame extracted from a video and a data relating to the extracted frame. FIG. 8 illustrates an example of the frame data. When a frame is extracted from the video, appropriate identification information ID is allocated to each extracted frame. The frame related data may be expressed, for example, by an XML format illustrated in FIG. 8. The XML description illustrated in FIG. 8 includes information indicating a time point of the video from which each frame is generated and class and type information of the metadata as causes of extraction of the frame.

The XML description illustrated in FIG. 8 collects data pieces relating to a plurality of frames in a single XML description. However, it is also useful to employ a method for preparing an independent XML description for each frame. When the frame data having the above-described configuration is transmitted to the display apparatus 200, the display apparatus 200 may locate a frame to an intended position on the seek bar. The above-described frame data may be transmitted, for example, at the video distribution preparation timing or when a user performs a seek operation described below.

Figure 9:
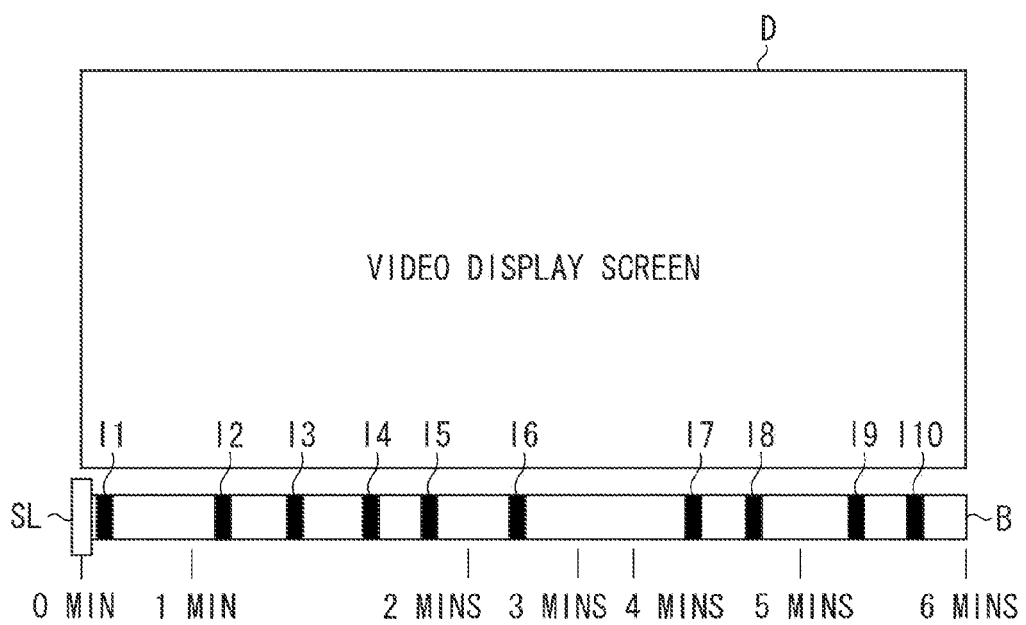
FIG. 9 illustrates a specific example of a non-linear seek bar according to an exemplary embodiment.

FIG. 9 illustrates an example of a representative user interface according to the present exemplary embodiment. In a seek bar illustrated in FIG. 9, a time width corresponding to a moving distance of the slider is narrow for an area where significant scenes for a user are present in a concentrated manner. On the other hand, the time width corresponding to the moving distance of the slider is expanded for an area where very few significant scenes for the user are present. When the user interface with the above-described seek bar having a non-linear relationship with the time width is provided, the user may reproduce a video according to the user's preference.

Next, an example of method for generating a non-linear seek bar is described below. First, the total time width of a video is divided into N (i.e., an appropriate number) sections. Then, an appropriate score is allocated to each divided section considering the number of significant scenes that exist in the section and the type of each significant scene as parameters. As the method for allocating a score, various methods may be used, for example, a method for allocating a higher score to a scene that is important for a user and for allocating a negative score to a scene that a user does not want to view.

Then a seek bar is divided into a plurality of sections proportional to the score of each section and allocated to each section. As described above, a non-linear seek bar may be formed.

When the division number N is six and a method for "adding one to the number of significant scenes that are present in each section" is employed as a score calculation method, the seek bar illustrated in FIG. 1 may be changed into the non-linear seek bar as illustrated in FIG. 9.

Next, a specific example of the user interface data transmitted from the video distribution apparatus 704 to the display apparatus 200 is described below with reference to FIG. 10. The user interface data illustrated in FIG. 10 are expressed using the XML format and includes the following contents.
(1) user interface class (i.e., "seekBar" in this example), (2) total time of video, and (3) correspondence relationship between video time point and seek bar position.

The display apparatus 200 receives the above-described user interface data and performs user interface generation processing.

Figure 11:
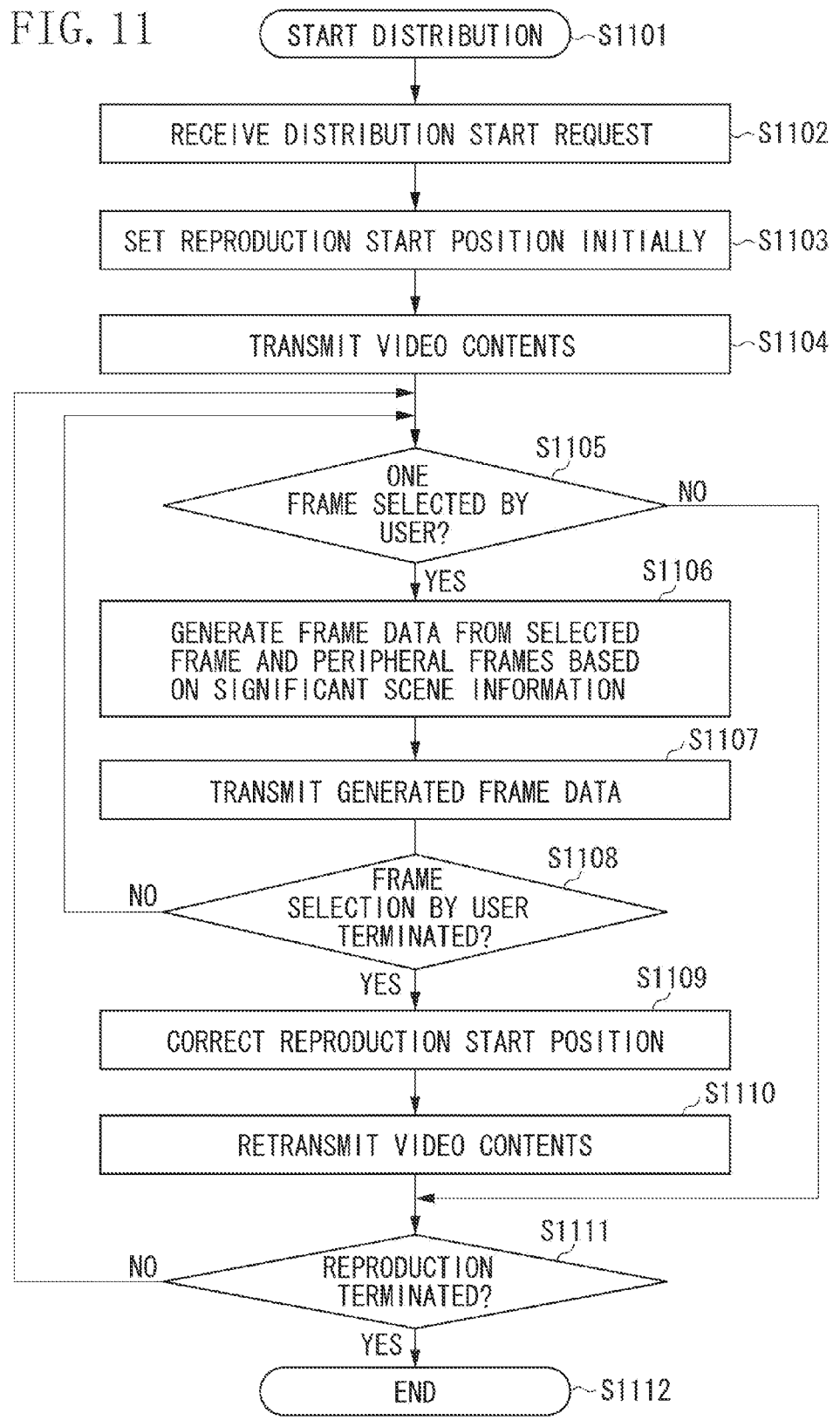
FIG. 11 is a flowchart illustrating a detail of distribution illustrated in FIG. 5.

Next, an example of a method for distributing video contents (i.e., the processing in operation S600) is described in detail below with reference to FIG. 4 and FIG. 11. As described above, before starting the video distribution processing, the video distribution apparatus 100 transmits frame data corresponding to significant scenes to the display apparatus 200.

In operation S1101, if the video distribution is started, then in operation S1102, the video distribution apparatus 100 receives a distribution start request from the display apparatus 200. Next, in operation S1103, the video distribution apparatus 100 sets a beginning of the video contents to a reproduction start position. In operation S1104, the video distribution apparatus 100 transmits the video contents to the display apparatus 200.

In operation S1105, it is determined whether a user performs a seek operation to select one frame of the video contents. If the user performs the seek operation and selects one frame of the video contents (YES in operation S1105), the processing proceeds to operation S1106.

The display apparatus 200 transmits the information indicating a selected frame as seek information to the frame data generation unit 108. In operation S1106, the frame data generation unit 108 generates frame data from a specific range including the selected frame and peripheral frames at shorter time intervals compared to the time intervals of the previously extracted frames. In operation S1107, the video distribution apparatus 100 transmits the generated frame data to the display apparatus 200.

In operation S1108, the video distribution apparatus 100 determines whether the user finishes frame selection operation. If it is determined that the user has finished the frame selection operation (YES in operation S1108), then in operation S1109, the video distribution apparatus 100 corrects the reproduction start position. In operation S1110, the video distribution apparatus 100 transmits the video contents again to the display apparatus 200. If the video distribution apparatus 100 determines that the user has not yet finished the frame selection operation (NO in operation S1108), the processing returns to operation S1105.

In operation S1111, the video distribution apparatus 100 determines whether the reproduction processing has been finished. If the video distribution apparatus 100 determines that the reproduction processing has not yet been finished (NO in operation S1111), the processing returns to operation S1105. If it is determined that the reproduction processing has been finished (YES in operation S1111), the processing proceeds to operation S1112 to perform termination processing.

Figure 12:
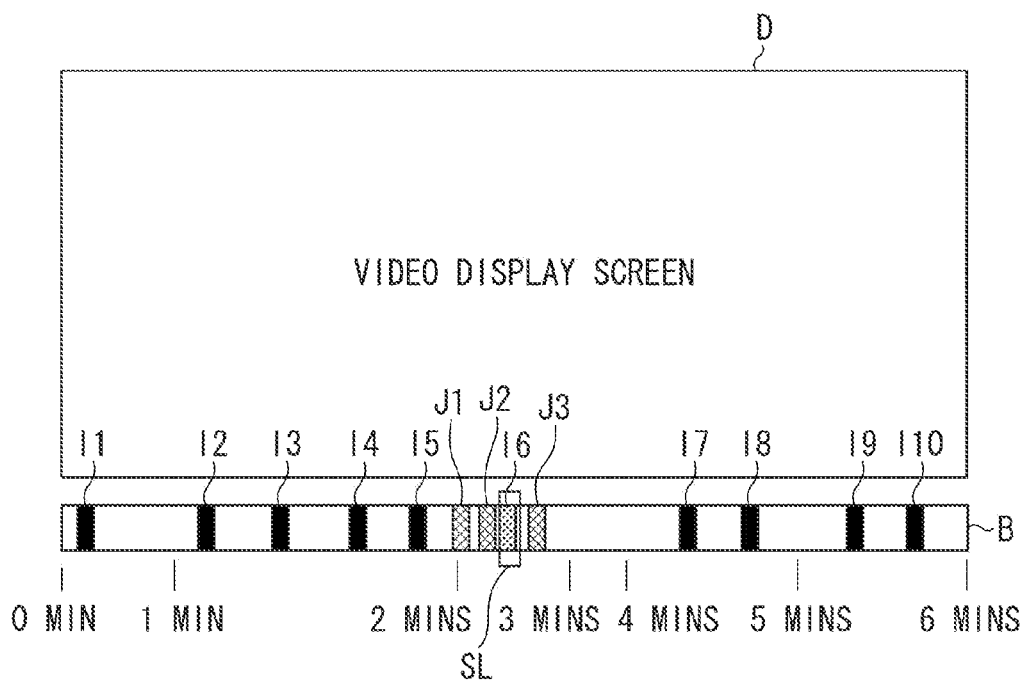
FIG. 12 illustrates an example of frame data dynamically generated in a peripheral area of a target frame.

FIG. 12 illustrates an example of the seek operation performed by a user. According to the example illustrated in FIG. 12, frame data pieces corresponding to significant scenes, which are transmitted to the display apparatus 200 before starting the video distribution processing, are located on positions I1 to I10 on the seek bar.

When the user has moved the slider SL to the position I6 as illustrated in FIG. 12, frame data pieces J1 to J3 are dynamically generated and disposed in the vicinity of the position I6 on the seek bar, so that the user may perform a seek operation finely.

If the user finishes the frame selection operation, then in operation S1109, the video distribution apparatus 100 corrects the reproduction start position. In operation S1110, the video distribution apparatus 100 performs redistribution of the video contents. Performing stepwise transmission of frame data as described above is useful because users may easily seek intended significant scenes in the entire area of the video contents and may finely perform a seek operation without using a communication band uselessly.

Next, an example method for extracting a frame to be transmitted when a user starts a seek operation is described below. There are some methods applicable to generate frame data to be transmitted when a user starts the seek operation.

The first method is characterized by generating a plurality of frame data pieces at time points spaced a predetermined time interval from a selected frame. For example, if the selected frame is extracted from a time point of 22.50 seconds of the video content, two frame data pieces are generated at time points spaced 2.00 seconds before and after the time point 22.50 seconds, and further two frame data pieces are generated at time points spaced 1.00 second before and after the time point of 22.50 seconds.

The second method is characterized by extracting a frame corresponding to preferences of a user other than a user who currently intends to watch a video. Hereinafter, the user who intends to watch a video is referred to as a "viewing user" and the user other than the viewing user is referred to as "another user." As described above, the significant scene determination unit 106 generates the video significant scene information based on user's favorite data and metadata.

In this case, the significant scene determination unit 106 generates significant scene information not only for the viewing user based on viewing user's preference data but also for another user based on another user's preference data beforehand. Thus, frame data corresponding to the significant scenes for another user may be generated. Accordingly, the viewing user in a seek operation may find a scene that might be missed if the significant scene information is generated only from the viewing user's preference data. However, from the viewpoint of personal information protection, it is desired that a range for another user may be set in advance.

Further, the embodiments may be realized by executing the following processing. More specifically, the processing includes supplying software (computer program) that may realize the functions of the above-described exemplary embodiments to a system or an apparatus via a network or an appropriate computer readable storage medium. Further, the processing includes causing a computer (or a central processing unit (CPU) or a micro-processing unit (MPU)) of the system or the apparatus to read and execute the program.

Further, the present exemplary embodiment may also be realized by supplying software (e.g., a program or a set of instructions) for realizing the functions of the above exemplary embodiments to a system or an apparatus via a network or via various storage media, and having a computer (a central processing unit (CPU) or a micro processing unit (MPU)) of the system or apparatus read and execute the program or the instructions recorded/stored on an article of manufacture having a memory device or a non-transitory storage medium to perform operations or functions of the above-described embodiments. In this case, this program and the recording medium on which the program is recorded/stored constitute one disclosed aspect of the embodiments. In addition, the program may be executed by one computer, or by a plurality of computers linked together.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., a video distribution apparatus, a video). In addition, the operations in the method transform the elements or parts from one state to another state. The transformation is particularized and focused on controlling a video distribution apparatus. The transformation provides a different function or use such as extracting a significant scene, generating a timeline, displaying the generated timeline, etc.

addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, and program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, and micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic, or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send, and receive data to and from a hardware device. An apparatus may include any combination of hardware, software, and firmware modules/units.

While the embodiments have been described with reference to exemplary embodiments, it is to be understood that the embodiments are not limited to the disclosed exemplary embodiments. The scope of the following claims is to be accorded the broadest interpretation so as to encompass all modifications, equivalent structures, and functions.

This application claims priority from Japanese Patent Application No. 2010-278288 filed Dec. 14, 2010, which is hereby incorporated by reference herein in its entirety.

What is claimed is:

1. A display control apparatus, comprising:
an obtaining unit configured to obtain the number of predetermined scenes in a video; and
a display control unit configured to display, on a display unit, a timeline in which an object indicating a position of the predetermined scene in the video is arranged,
wherein the display control unit performs control such that in a case where the number of the predetermined scenes included in a predetermined time period of the video is larger than a predetermined number, the predetermined time period is displayed, on the timeline, with a first width, and in a case where the number of the predetermined scenes included in the predetermined time period of the video is smaller than a predetermined number, the predetermined time period is displayed, on the timeline, with a second width different from the first width.

2. A method for controlling a display control apparatus, the method comprising:
obtaining a number of predetermined scenes in a video;
displaying, on a display unit, a timeline in which an object indicating a position of the predetermined scene in the video is arranged; and
performing control such that a predetermined time period in a video is displayed, on a timeline, with a width which varies depending on the number of the predetermined scenes.

3. A non-transitory computer-readable storage medium storing a program having instructions that, when executed by a computer, cause the computer to perform operations to control a display control apparatus, the operations comprising:
obtaining a number of predetermined scenes in a video;
displaying, on a display unit, a timeline in which an objecy indicating a position of the predetermined scene in the video is arranged; and
performing control such that a predetermined time period in a video is displayed, on the timeline, with a width which varies depending on the number of the predetermined scenes.

4. A display control apparatus, comprising:
an obtaining unit configured to obtain the number of predetermined scenes in a video; and
a display control unit configured to display, on a display unit, a timeline in which an object indicating a position of the predetermined scene in the video is arranged,
wherein the display control unit performs control such that a predetermined time period in the video is displayed, on the timeline, with a width which varies depending on the number of the predetermined scenes obtained by the obtaining unit.

5. The display control apparatus according to claim 4, wherein the display control unit displays the video on the display unit.

6. The display control apparatus according to claim 5, wherein the extraction unit that extracts a significant scene is configured to generate user's favorite data considering user's preference and weight on the metadata based on the generated user's favorite data.

7. The display control apparatus according to claim 6, wherein the user's favorite data received from the external device has a data format expressed by a markup language or a binarized format of the markup language.

8. The display control apparatus according to claim 6, wherein the user's favorite data represents a score allocated to each type of the metadata.

9. The display control apparatus according to claim 6, wherein the significant scene represents a time point of the video that corresponds to a metadata type having a high score in the user's favorite data.

10. The display control apparatus according to claim 6, further comprising a metadata generation unit configured to dynamically generate metadata based on the video if metadata corresponding to the user's favorite data is not present.

11. The display control apparatus according to claim 5, wherein the extraction unit that extracts a significant scene is configured to acquire user's favorite data from an external device and weight on the metadata based on the acquired user's favorite data.

12. The display control apparatus according to claim 4, further comprising an extraction unit configured to extract the predetermined scene of the video by weighting on metadata indicating contents of the video, as weighting settable for user,
wherein the obtaining unit obtains the number of the predetermined scenes exacted by the exaction unit.

13. The display control apparatus according to claim 12, wherein the metadata is data representing video features of a scene appearing at each time point of the video.

14. The display control apparatus according to claim 12, wherein the metadata includes at least one of face/object recognition information, scene recognition information, zooming operation information performed on a video camera which captured a video, sound volume change information, audio recognition information, and user defined tagged information.

15. The display control apparatus according to claim 12, wherein the extraction unit extracts plural predetermined scenes for each user by weighting on the metadata, as weighting settable for each user who watches the video.

16. The display control apparatus according to claim 4, further comprising:
a generation unit configured to generate frame data based on a frame extracted from the video and information of the frame, and
a transmission unit configured to transmit the frame data generated by the generation unit.

17. The display control apparatus according to claim 16, further comprising a receiving unit configured to receive seek information indicating that a user selected one frame of the video,
wherein the generation unit generates frame data corresponding to a frame selected by the user, in a case where the receiving unit receives the seek information.

18. The display control apparatus according to claim 16, further comprising a receiving unit configured to receive seek information indicating that a user selected one frame of the video,
wherein the generation unit generates frame data of a plurality of frames corresponding to a specific time range in the video which includes a frame selected by a user and peripheral frames, in a case where the receiving unit receives the seek information.

19. The display control apparatus according to claim 16, wherein the display control unit controls the display unit to display the frame based on the frame data generated by the generation unit.

20. The display control apparatus according to claim 4, wherein the timeline includes at least one of a bar indicating, as length, an amount of reproductions of the video and a slider which moves in correspondence to a current time point of the reproduced video.

21. The display control apparatus according to claim 20, wherein the display control unit displays, on the bar, a time corresponding to a moving distance of the slider, by using a time width which varies depending on the number of the predetermined scenes obtained by the obtaining unit.

22. The display control apparatus according to claim 20, wherein the bar and the slider, which are transmitted, are in a data format expressed by a markup language or in a binarized format of the markup language.

* * * * *